United States Patent

[11] 3,627,373

| [72] | Inventors | Robert M. Fox<br>Warren;<br>Arthur W. Hoffmann, Sterling Heights,<br>both of Mich. |
|---|---|---|
| [21] | Appl. No. | 12,808 |
| [22] | Filed | Feb. 19, 1970 |
| [45] | Patented | Dec. 14, 1971 |
| [73] | Assignee | General Motors Corporation<br>Detroit, Mich. |

[54] VEHICLE BODY
4 Claims, 5 Drawing Figs.

[52] U.S. Cl. .................................................. 296/28 R, 296/31 P
[51] Int. Cl. ...................................................... B62d 25/08
[50] Field of Search ........................................... 296/28 R, 31, 31 P, 76

[56] References Cited
UNITED STATES PATENTS

| 2,538,839 | 1/1951 | Limberg .................. | 296/28 R |
| 2,474,992 | 7/1949 | Stephenson et al. ........... | 296/28 R |
| 2,876,037 | 3/1959 | Ingolia et al. .................. | 296/28 R |
| 3,409,323 | 11/1968 | Schweser ..................... | 296/28 R |
| 3,072,582 | 1/1963 | Frost ............................. | 260/2.5 AF |
| 3,391,093 | 7/1968 | Frost ............................. | 260/2.5 AF |

FOREIGN PATENTS

| 670,172 | 1/1966 | Belgium ........................ | 296/31 P |

Primary Examiner—Leo Friaglia
Assistant Examiner—Leslie J. Paperner
Attorneys—W. E. Finken and Herbert Furman

ABSTRACT: The bootleg pocket of a vehicle body is completely filled with a foamed-in-situ mass of rigid synthetic resin which is adhered to the body members defining the pocket. The upper exposed surface of the mass of resin is located angularly to the rear floor pan of the body and a cover adhered to this surface and supported by the mass of resin provides a continuation of the rear floor pan and also drains liquid to the floor pan.

INVENTORS,
Robert M. Fox &
BY Arthur W. Hoffmann

Herbert Furman
ATTORNEY

INVENTORS
Robert M. Fox &
BY Arthur W. Hoffmann

Herbert Furman
ATTORNEY

VEHICLE BODY

This invention relates to vehicle bodies and more particularly to the bootleg pockets of a vehicle body.

Conventionally, vehicle bodies have had bootleg pockets for many years. The bootleg pockets are located to each side of the rear floor pan or rear deck of the body. Such pockets are generally defined by the rear wheel housings, by the quarter outer panels and by the rear floor pan extensions.

In the preferred embodiment of the invention, the bootleg pockets are each filled with a mass of foamed-in-situ rigid synthetic resin, such as polyurethane. The foamed resin supports suitable covers which form continuations of the upper surface of the rear floor pan. The masses of foamed resin are adhered to both the body members and the covers since the resin is foamed in situ.

Preferably, an excess amount of foamable material is initially poured into a pocket and then a cover is placed over the opening of the pocket. A resilient bias is applied to the cover at its inner edge adjacent the rear floor pan. As the material foams, it first completely fills the pocket and then expands above the opening of the pocket since an excess amount of material is used. As the excess foam expands above the opening of the pocket, it acts against the resilient bias to tilt the cover inboard of the body to an angular position with respect to the floor pan so that any water or other fluids which might collect on the cover are drained to the floor pan. Conventional drains on the floor pan drain the fluid to the exterior of the body.

Conventionally, the rear floor pan extensions include one or more openings which are required for manufacturing purposes and are provided with plugs after the need therefor has been satisfied. Such plugs can either be used with the present invention or they can be dispensed with inasmuch as the foam will expand through the openings and provide mushroom-type caps.

It is therefore the primary object of this invention to provide a vehicle body having the bootleg pockets thereof filled with masses of foamed-in-situ rigid synthetic resin which support covers forming continuations of the rear floor pan. It is another object of this invention to provide a vehicle body having the bootleg pockets thereof filled with masses of foamed-in-situ synthetic resin which support covers in an angular position with respect to the rear floor pan and which are self-adhered to the surfaces of the vehicle body members defining the pocket and to the cover.

These and other objects of the invention will be readily apparent from the following specification and drawings wherein.

Figure 1:
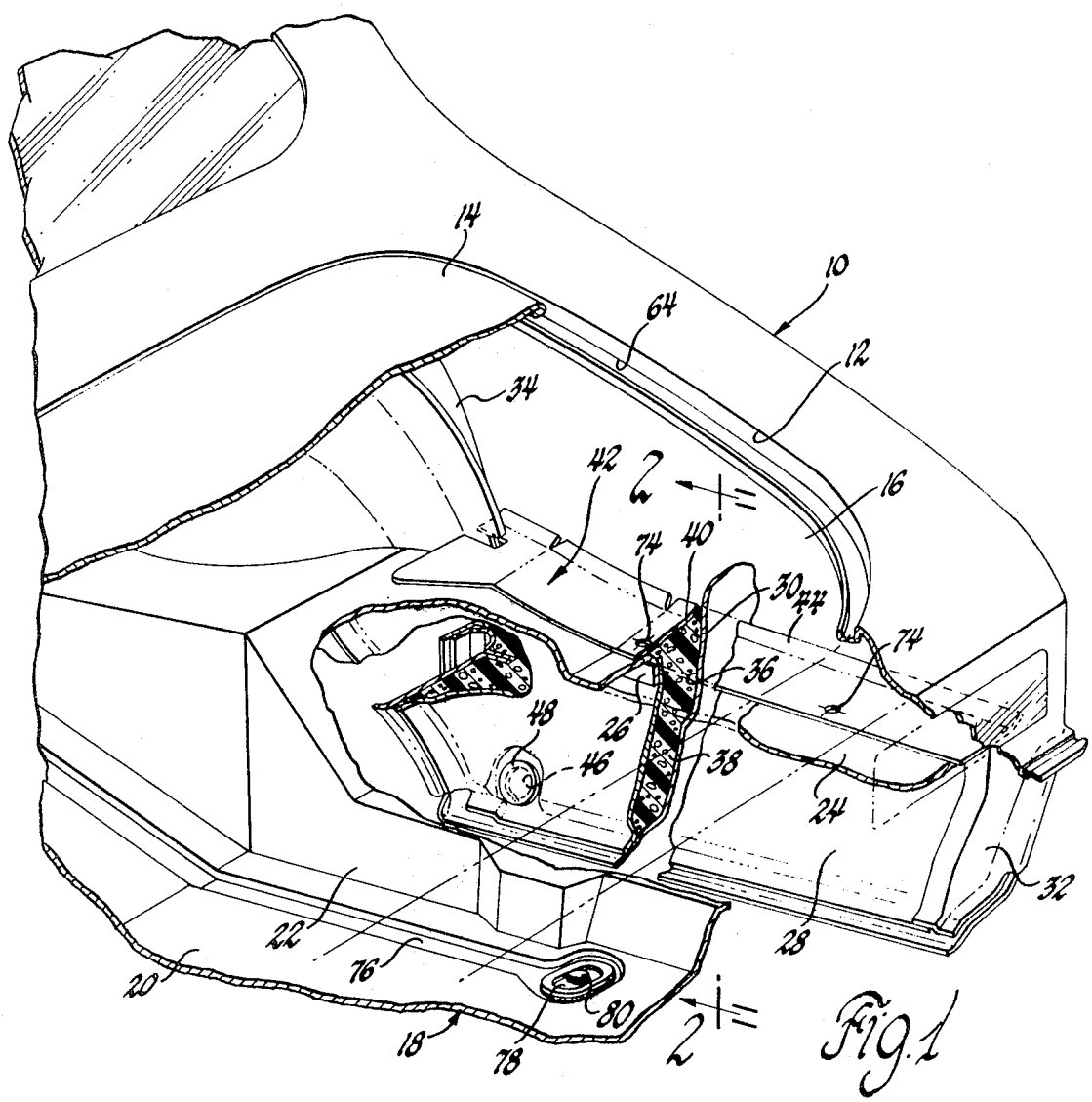
FIG. 1 is a partially broken away partial rear perspective view of the right rear portion of a vehicle body having a bootleg pocket filled with a mass of foamed-in-situ rigid synthetic resin and provided with a cover in accordance with the invention.

Referring now particularly to FIG. 1, a generally conventional vehicle body designated 10 includes a rear deck opening 12 which is opened and closed by a conventionally hinged and latched rear deck 14. The opening 12 provides access to the rear compartment 16 of the body. Since both sides of the compartment are the same although asymmetrical, only the right-hand side will be particularly described.

Figure 2:
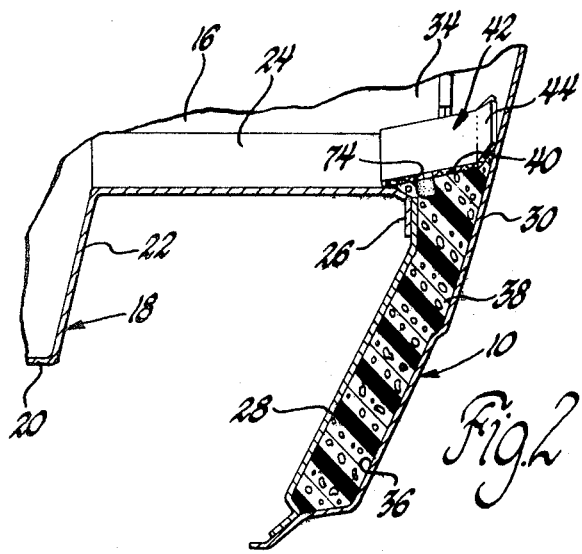
FIG. 2 is an enlarged sectional view taken generally along the plane indicated by line 2—2 of FIG. 1.

The lower wall of the compartment 16 is conventionally provided by a rear floor pan 18. The floor pan includes a lower wall 20, a sidewall 22, and an upper wall 24 which extends laterally outwardly from wall 22. The outer flanged edge 26 of wall 24, FIG. 2, is welded to the upper flanged edge of a rear floor pan extension or member 28. Spaced from the member 28 is the rear quarter outer panel 30 of the body. The lower flanged edges of member 28 and panel 30 are conventionally welded to each other. The rearward edges of member 28 and panel 30 are conventionally secured together by a closure panel 32, FIG. 1, and the forward edges of the members 28 and 30 are conventionally secured to the rear wheel housing structure 34. In certain body structures, the closure panel 32 is dispensed with and the rear edges of the members 28 and 30 are secured together.

From the foregoing, it can be seen that the member 28 and panels 30 and 32 and the rear wheel housing structure 34 define a conventional bootleg pocket 36. Such pockets are conventional in substantially all body styles.

In accordance with this invention, the bootleg pocket 36 is completely filled with a foamed-in-situ mass 38 of rigid synthetic resin. While any suitable rigid foam may be used, it has been found that rigid polyurethane closed cell foam works very well. For suitable rigid polyurethane closed cell foam compositions and mixing methods, reference may be had to Frost U.S. Pat. Nos. 3,072,582 and 3,391,093.

As can be seen in FIGS. 1 through 4 of the drawings, the upper exposed surface 40 of the mass 38 is located angularly to the normal generally horizontal surface of the wall 24 and a cover 42 seats on the surface 40 and is supported by the mass 38 of foam to provide an angular continuation of the wall 24 to the outer panel 30 of the body. As shown in FIG. 1, the cover 42 generally extends over the complete opening of the bootleg pocket and includes a forward slot to receive the pinchweld flange of the rear wheel housing structure 34. The outer flanged edge portion 44 of the cover 42 is notched so as to be flexibly disposed to the main body of the cover. Thus, each section of the outer edge portion 44 can be bent laterally to the body 10 to follow the inner contour of the panel 30.

As will be further described in detail, the mass 38 of foamed resin is formed in situ within the bootleg pocket 36 after the opening of the pocket has been closed by the cover 42. The mass 38 is thus self-adhering to the surfaces of the body members 28, 30, 32, and 34 and the cover 42. Thus, the mass 38 of foamed-in-situ rigid synthetic resin completely fills the bootleg pocket, supports the cover 42, and is self-adhered to both the body members and cover.

After the vehicle body has been assembled to a body-in-white condition, it is normally dipped in one or more liquid baths. One or more openings 46, FIG. 1, are conventionally provided adjacent the lower pinchweld flange of member 28 so that the bath material can flow out of the body as the body is removed from the bath. Such openings are thereafter conventionally closed by plugs 48, as shown in FIG. 1.

After the body has been dipped, the foam composition is poured into the bootleg pocket by conventional mixing equipment. Normally an excess amount of composition is used for a reason to be set forth hereinafter. As soon as the composition has been poured into the pocket, the cover 42 is placed over the opening of the pocket and located in a generally horizontal position, with the flanged edge 44 engaging the inner surface of panel 30. A suitable fixture is then provided to exert a resilient bias on cover 42 and allow a certain degree of tilting movement thereof as the composition foams so that the cover 42 will be positioned angularly to wall 24 as shown in FIGS. 1 and 2 after the foaming operation is completed. Such fixture is shown in FIGS. 3, 4, and 5 and is designated generally 50.

The fixture generally comprises a lower tubular member 52 and an upper hollow tubular member 54 which slidably receives the member 52. A compression spring 56 seated between the upper closed end of member 54 and the upper end of member 52 biases the members 52 and 54 apart or outwardly of each other. The movement of the members in this direction is controlled by the engagement of a cross pin 58 through member 52 with the lower edges of closed diametrically opposed and axially disposed slots 60 in the lower end of member 54. A plastic button or cap 62 closes the upper end of member 54 and includes a shaped notch adapted to engage underneath the gutter 64 which defines the opening 12.

Figure 5:
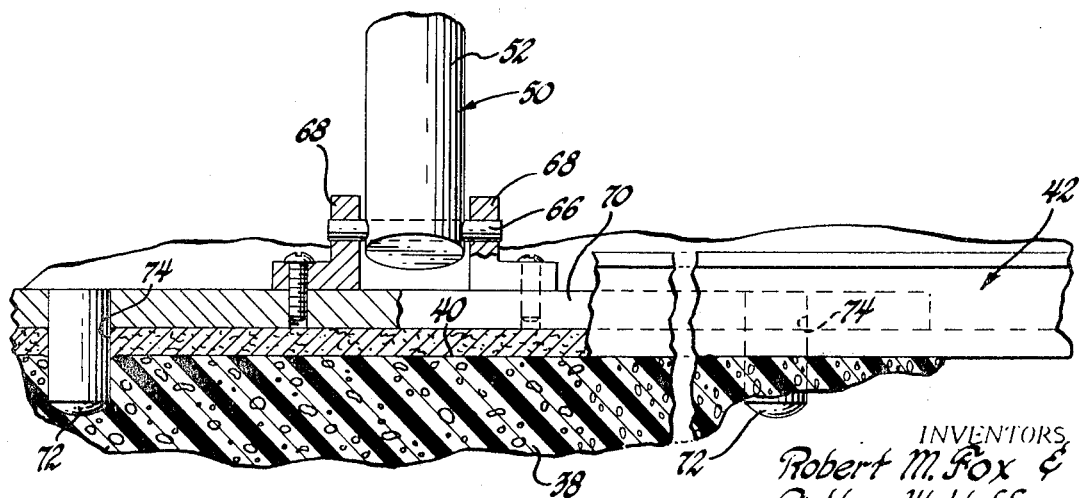
FIG. 5 is an enlarged view taken generally along the plane indicated by line 5—5 of FIG. 3.

The lower end of the member 52, as shown in detail in FIG. 5, is pivoted by cross pin 66 to spaced apertured angle brackets 68 which in turn are secured to a bed or plate 70. Generally this bed or plate is of a size to engage the main body of the cover 42. Plate 70 is provided with a pair of pins 72 which are received within openings 74 in the cover 42 and engage the upper flanged edge of member 28.

Figure 3:
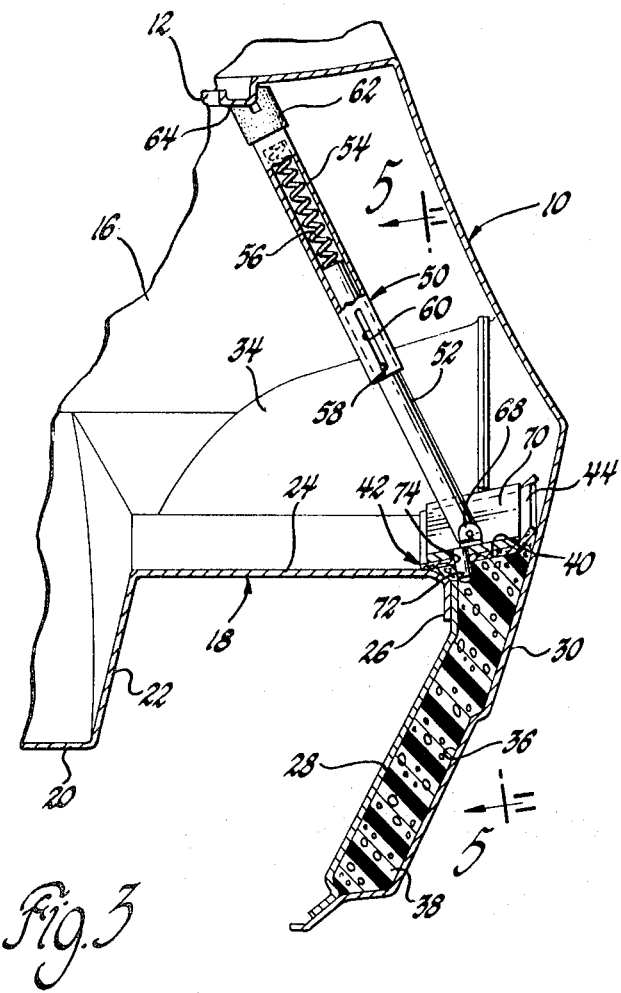
FIG. 3 is a view similar to FIG. 2 during the foaming operation.
Figure 4:
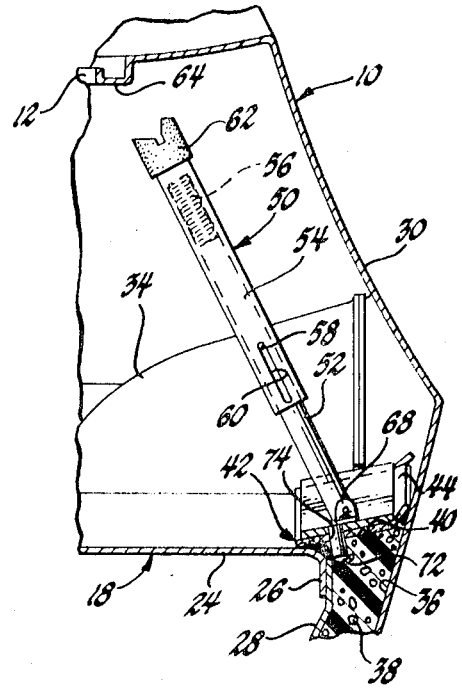
FIG. 4 is a view similar to FIG. 3 after the foaming operation.

As soon as the foam composition has been poured into the bootleg pocket and the cover 42 placed over the opening of the pocket, the fixture 50 is thereafter positioned between the gutter 64 and the cover 42, as shown in FIG. 3. Of course the cover 42 is initially in a generally horizontal position as previously set forth. Since an excess amount of composition is placed within the bootleg pocket, the excess composition will foam above the opening of the pocket as soon as the pocket is completely filled. With reference to FIG. 3, it will be noted that the line of force or resilient bias of the fixture 50 is directed adjacent the inner wall of the bootleg pocket, or immediately adjacent the upper flanged edge of the member 28 which provides this wall. Thus the force of the excess foam composition will tend to lift the cover 42 at its outboard edge. As this occurs, the plate 70 can rotate with cover 42 relative to the member 52 about pin 66 as spring 56 is slightly compressed. Thus, when the foaming operation is completed, the mass 38 has an angularly disposed upper surface 40 and the cover 42 is likewise angularly disposed. The cover 42 is disposed in this position so that any water which might happen to engage the exposed surface of the cover 42 will drain inboard of the body.

After the foaming operation has been completed, the member 54 is manually moved downwardly as shown in FIG. 4, and then the members 54 and 52 are tilted inwardly of the body or counterclockwise, viewed in FIG. 4. Thereafter, the fixture 50 is removed as a unit through the opening 12. It is believed apparent that the fixture 50 is installed in the reverse manner.

In certain body structures, the walls 20 and 24 of the rear floor pan 18 will normally be on the same level or generally coplanar. In such instance or in the structure as shown in FIGS. 1 and 2, the portion 20 of the floor pan can be provided with one or more depressed drains 76 which may lead to sumps 78 provided with conventional drain plugs 80 which permit the escape of water to the exterior of the body.

Likewise, if desired, the cover 42 and the upper exposed surface 40 of the mass 38 can be located generally coplanar with the wall 24, although it is preferred that they be angularly disposed as shown herein.

Likewise, if desired, the drain plug 48 may be dispensed with and the foam composition can then foam through the opening 46 and provide a mushroom-type cap.

Thus, this invention provides an improved vehicle body.

What is claimed is:

1. In a vehicle body having a plurality of cooperatively defining a bootleg pocket, the combination comprising, a mass of foamed rigid synthetic resin completely filling said pocket, and a cover closing the opening of the pocket and seating on the mass of foamed resin to support the cover over the opening of the pocket, the mass of foamed resin being adhered to the surface of the body members defining the pocket and to the cover.

2. In a vehicle body having a plurality of body members cooperatively defining a bootleg pocket, and a generally horizontal body floor pan member adjacent the pocket, the combination comprising, a mass of foamed rigid synthetic resin completely filling said pocket and being adhered to the surface of the body members defining the pocket, the exposed surface of the mass of foamed resin being located angular to the floor pan member, and a cover closing the opening of the pocket and seating on the exposed surface of the mass of foamed resin to support the cover in an angular position with respect to the floor pan member and drain fluid from the cover thereto.

3. In a vehicle body having a plurality of body members cooperatively defining a bootleg pocket, the combination comprising, a cover extending between the body members and over the pocket opening to close the pocket, and a mass of foamed rigid synthetic resin completely filling said pocket and being adhered to the surfaces of the body members defining the pocket and to the cover, the mass of resin being foamed in situ within the closed pocket.

4. In combination with a vehicle body having a plurality of body members cooperatively defining a bootleg pocket and including an outer panel member defining the outer wall of the pocket, the opening of the pocket being generally coplanar with at least a portion of an adjacent floor pan member, the combination comprising, a mass of foamed rigid synthetic resin completely filling the pocket and being adhered to the surfaces of the body members defining the pocket, and a cover closing the opening of the pocket and seating on the mass of foamed resin to support the cover over the opening of the pocket between the outer panel and floor pan members and form a continuation of the floor pan member to the outer panel member, the mass of foamed resin being adhered to the cover, the cover including an outer segmented edge portion flexible with respect thereto and engageable with the body outer panel.

* * * * *

PO-1050
(5/69)

UNITED STATES PATENT OFFICE
CERTIFICATE OF CORRECTION

Patent No. 3,627,373        Dated December 14, 1971

Inventor(s) Robert M. Fox and Arthur W. Hoffmann

It is certified that error appears in the above-identified patent and that said Letters Patent are hereby corrected as shown below:

Column 4, line 5, after "plurality of" and before "cooperatively" insert -- body members, --.

Signed and sealed this 22nd day of August 1972.

(SEAL)
Attest:

EDWARD M. FLETCHER, JR.
Attesting Officer

ROBERT GOTTSCHALK
Commissioner of Patents